US006559207B1

(12) United States Patent
English et al.

(10) Patent No.: US 6,559,207 B1
(45) Date of Patent: May 6, 2003

(54) FLAME RESISTANT POLYMER COMPOSITION AND METHOD FOR RENDERING POLYMERS FLAME RESISTANT

(75) Inventors: Larry English, Ringgold, GA (US); Courtney Tyvand, Ooltewah, TN (US); Kevin Kirkland, Ringgold, GA (US)

(73) Assignee: SI Corporation, Chickamauga, GA (US)

( * ) Notice: Subject to any disclaimer, the term of this patent is extended or adjusted under 35 U.S.C. 154(b) by 0 days.

(21) Appl. No.: 09/524,819

(22) Filed: Mar. 14, 2000

(51) Int. Cl.⁷ ............................................. C08K 5/3492
(52) U.S. Cl. ...................... 524/102; 524/100
(58) Field of Search ................ 524/142, 496, 524/100, 101, 102, 103, 415, 417, 80, 436, 405; 8/490; 423/449.2; 523/215, 220; 428/408; 442/136

(56) References Cited

U.S. PATENT DOCUMENTS

| | | | |
|---|---|---|---|
| 3,650,300 A | | 3/1972 | Listner ........................ 139/420 |
| 3,808,127 A | * | 4/1974 | Sander et al. .................. 524/80 |
| 3,931,101 A | * | 1/1976 | Dany et al. .................... 524/80 |
| 4,105,735 A | * | 8/1978 | Dany et al. .................... 524/80 |
| 4,136,082 A | | 1/1979 | Brady .................. 260/45.9 AD |
| 4,154,718 A | * | 5/1979 | Miyata et al. ............... 524/436 |
| 4,328,139 A | | 5/1982 | Simons ........................ 252/606 |
| 4,440,880 A | * | 4/1984 | Albanesi et al. ............. 523/205 |
| 4,467,056 A | * | 8/1984 | Staendeke et al. ........... 523/179 |
| 4,727,102 A | * | 2/1988 | Scarso ........................ 524/100 |
| 4,785,031 A | * | 11/1988 | Scarso ........................ 524/414 |
| 4,935,063 A | * | 6/1990 | Costanzi et al. ............. 106/446 |
| 5,021,483 A | * | 6/1991 | Galbo ......................... 524/100 |
| 5,024,869 A | | 6/1991 | Yeh et al. ..................... 428/97 |
| 5,057,562 A | * | 10/1991 | Reinert ........................ 524/100 |
| 5,071,901 A | * | 12/1991 | Chakrabarti et al. ........ 524/416 |
| 5,096,950 A | | 3/1992 | Galbo et al. ................... 524/99 |
| 5,212,245 A | * | 5/1993 | Franks et al. ................ 525/223 |
| 5,342,862 A | * | 8/1994 | Reich .......................... 524/496 |
| 5,393,812 A | | 2/1995 | Haley et al. ................... 524/91 |
| 5,473,001 A | | 12/1995 | Myers ........................... 524/89 |
| 5,654,356 A | | 8/1997 | Namiki et al. ............... 524/413 |
| 5,827,906 A | * | 10/1998 | Metzemacher et al. ..... 524/436 |
| 5,910,213 A | * | 6/1999 | Ashdown et al. ............ 106/436 |
| 5,962,574 A | * | 10/1999 | Jackson et al. .............. 524/496 |
| 6,117,995 A | * | 9/2000 | Zedda et al. ................. 524/100 |
| 6,126,861 A | * | 10/2000 | Bechtold ..................... 524/100 |
| 6,262,161 B1 | * | 7/2001 | Betso et al. ................. 524/425 |
| 6,271,377 B1 | * | 8/2001 | Galbo et al. ................... 546/14 |
| 6,309,987 B1 | * | 10/2001 | Srinivasan .................. 428/920 |

OTHER PUBLICATIONS

WO 99/00450 Pub. Jan. 7, 1999 Ciba Specialty Chemicals—Horsey et al.

* cited by examiner

*Primary Examiner*—Peter Szekely
(74) *Attorney, Agent, or Firm*—Renner, Kenner, Greive, Bobak, Taylor & Weber

(57) ABSTRACT

A flame resistant composition comprises (a) a polymer; (b) a synergistic mixture comprising (i) from about 0.6 to about 3 percent of a non-halogenated flame retardant compound; and (ii) at least about 0.06 percent of a compatible additive; wherein said percentages are based on weight percent of (a) plus (b), wherein (a) plus (b) equals 100 percent. A method of rendering a polymer flame resistant comprises compounding said polymer with a synergistic mixture comprising (i) from about 0.6 to about 3 percent of a non-halogenated flame retardant compound; and (ii) at least about 0.06 percent of a compatible additive; wherein the percentages are based on weight percent of polymer plus the synergistic mixture, and wherein polymer plus synergistic mixture equals 100 percent.

15 Claims, No Drawings

FLAME RESISTANT POLYMER COMPOSITION AND METHOD FOR RENDERING POLYMERS FLAME RESISTANT

TECHNICAL FIELD

This invention relates to flame resistant compositions. More particularly, this invention relates to flame resistant polymer compositions. Even more particularly, this invention relates to flame resistant polymers with a synergistic mixture of flame retardant and compatible additive which allows a lower concentration of flame retardant to be used than would otherwise be effective. The invention further provides a method for rendering polymers flame resistant.

BACKGROUND OF THE INVENTION

Many polymer compositions are not ordinarily flame resistant. In fact, certain polymers, such as polyolefins, can be highly flammable. Imparting flame resistance to polymer compositions can be highly desirable or even required for polymers to be useful in certain applications such as those in the textile field. Various compounds are known to impart flame resistance to polymer compositions.

The use of sterically hindered amines to render polymers flame resistant is well known. Hindered amines have been previously added to polyolefins to impart resistance to the effects of light, heat and oxygen. Certain hindered amines, however, were previously found to be incompatible with some flame retardants and other compounds. Specifically, organohalogenated and organosulfur compounds were found to interfere with the activity of some hindered amines as photostabilizers. A subset of these hindered amines, however, are compatible with such compounds. These hindered amines are known as N-alkoxy (or NOR) substituted hindered amines or NOR hindered amine light stabilizers (NOR HALS). U.S. Pat. No. 5,096,950, for example, discloses the use of NOR substituted hindered amines in conjunction with a polyolefin substrate. Similarly, U.S. Pat. No. 5,393,812 discloses the use of a halogenated hydrocarbyl phosphate and phosphonate ester flame retardant with an alkoxyamine hindered amine to render a polyolefin product flame retardant, light stable, and resistant to fading. It was subsequently determined that N-alkoxy substituted hindered amines function as not only light stabilizers, but also impart flame resistance to polyolefins.

The discovery of the utility of NOR substituted hindered amines as flame retardants provided several benefits including the elimination of certain toxic compounds from flame resistant articles. For example, some halo-organic compounds generate toxic by-products both during production and in the case of combustion of the final product. Additionally, some metal-containing flame retardants such as antimony oxides sometimes contain trace amounts of arsenic compounds.

The use of NOR substituted hindered amines as flame retardants and their structure are well known and are described in PCT Application PCT/US98/13469 (WO99/00450). One useful NOR substituted hindered amine is sold under the tradename CGL-116.

The use of NOR substituted hindered amines as flame retardants generally involves blending the NOR substituted hindered amine with a polymer and, optionally, additional components, followed by melt compounding the mixture into pellets. The polymer can then be processed into fiber, for example, by extruding. While the concentrations at which certain NOR substituted hindered amines are effective as flame retardants are generally lower than those at which brominated flame retardants are effective, it is still desirable to minimize the amount of these compounds used in order to minimize cost. For example, the cost of NOR substituted hindered amines represent a major portion of the cost of producing flame resistant fabrics.

It is also generally desirable to insure that any flame retardant compound used is homogeneously dispersed in the polymer to maximize its effectiveness and insure that excess flame retardant is not required to insure effective incorporation of the flame retardant in all portions of the polymer article. This is particularly important when using flame retardants that do not easily incorporate uniformly into a resin during extrusion.

It is further desirable to be able to add pigments to polymer compositions that do not interfere with the activity of the flame retardant, yielding colored flame retardant compositions. This is particularly desirable in industries such as the automotive fabric industry where colored flame resistant fabrics are currently produced by combining flame resistant fibers and non-flame resistant fibers. When both flame resistant and non-flame resistant fibers are combined in a non-woven fabric, concerns exist over non-homogeneous blending of the two types of fibers. If the blending is not homogeneous, localized areas of the fabric may not have sufficient concentration of flame resistant fibers for the complete article to be flame resistant.

SUMMARY OF INVENTION

It is, therefore, an object of the present invention to provide a flame resistant composition comprising a polymer and a synergistic mixture comprising a non-halogenated flame retardant compound and a compatible additive.

It is another object of the present invention to provide a flame resistant composition wherein a flame retardant compound is homogeneously dispersed through a polymer.

It is still another object of the present invention to provide a flame resistant composition comprising a polymer and a synergistic mixture comprising a non-halogenated N-alkoxy hindered amine and carbon black.

It is yet another object of the present invention to provide a flame retardant compound comprising a non-halogenated flame retardant compound and a pigment that does not interfere with the flame retardant compound.

It is still another object of the present invention to provide a method of rendering a polymer flame resistant comprising compounding a polymer with a synergistic mixture comprising a non-halogenated flame retardant compound and a compatible additive.

It is yet another object of the present invention to provide a method of rendering a polymer flame resistant comprising dispersing a non-halogenated N-alkoxy hindered amine homogeneously through a polymer.

It is still another object of the present invention to provide a method of rendering a polymer flame resistant comprising compounding a polymer with an effective amount of a synergistic mixture comprising a non-halogenated N-alkoxy hindered amine and carbon black.

It is yet another object of the present invention to provide a method of rendering a polymer flame resistant comprising dispersing a non-halogenated flame retardant compound and a pigment that does not interfere with the flame retardant compound.

It is still another object of the present invention to provide a flame resistant fiber comprising a polymer and a synergistic mixture comprising a non-halogenated flame retardant compound and a compatible additive.

It is still another object of the present invention to provide a pigmented flame resistant fiber comprising a polymer, a non-halogenated flame retardant compound, and a pigment that does not interfere with the flame retardant compound.

It is still another object of the present invention to provide a flame resistant fabric comprising a polymer and a synergistic mixture comprising a non-halogenated flame retardant compound and a compatible additive.

It is yet another object of the present invention to provide a pigmented flame resistant fabric comprising a polymer, a non-halogenated flame retardant compound, and a pigment which does not interfere with the flame retardant compound.

At least one or more of the foregoing objects, together with the advantages thereof over the known art relating to the use of flame retardants in polymer compositions, which shall become apparent from the specification which follows, are accomplished by the invention as hereinafter described and claimed.

In general the present invention provides a flame resistant composition comprising (a) a polymer; (b) a synergistic mixture comprising (i) from about 0.6 to about 3 percent of a non-halogenated flame retardant compound; and (ii) at least about 0.06 percent of a compatible additive; wherein said percentages are based on weight percent of (a) plus (b), wherein (a) plus (b) equals 100 percent.

The present invention also includes a method of rendering a polymer flame resistant comprising compounding said polymer with a synergistic mixture comprising (i) from about 0.6 to about 3 percent of a non-halogenated flame retardant compound; and (ii) at least about 0.06 percent of a compatible additive; wherein the percentages are based on weight percent of polymer plus the synergistic mixture, and wherein polymer plus synergistic mixture equals 100 percent.

These and other objects and advantages are obtained by the composition of the present invention, the general nature of which may be stated as compounding a polymer with a mixture of a compatible additive and a NOR substituted hindered amine flame retardant. The compatible additive aids in evenly distributing the flame retardant throughout the polymer. Without such a compatible additive, the flame retardant is not as easily incorporated uniformly into the polymer. For example, when a polymer such as polypropylene is extruded with the NOR substituted hindered amine CGL-116, an elevated temperature (compared to that required for the extrusion polypropylene without CGL-116) is required in the entry zones of the extruder to enable thorough mixing of the polymer and the flame retardant. We have also noted that extrusion of CGL-116 and polypropylene requires an extrusion apparatus design that enables greater mixing in the extruder than is otherwise required when CGL-116 is not present.

When the compatible additive is carbon black, it acts as a compatible additive and as a pigment. Lower levels of carbon black yield a gray polymer composition while higher levels of carbon black render the composition black.

It had been previously believed that the addition of carbon black as a pigment would require an increased amount of flame retardant in order to maintain flame resistance of the polymer. This belief was based on the rationale that carbon black would absorb the flame retardant and render it unavailable to act as a flame retardant. Surprisingly, it was discovered that addition of carbon black did not necessitate an increase in the level of CGL-116 required to maintain flame resistance, but instead, decreased it. While not wishing to condition patentability on any particular theory of action, we believe that the carbon black acts as a dispersing agent which adsorbs the flame retardant and is more easily dispersed into the polymer than the flame retardant alone. This belief is supported by the observation that when polypropylene is extruded with CGL-116, fewer filament breaks and godet wraps are observed when carbon black is present than when it is absent. Additionally, filaments appear to be more visually uniform when carbon black is a component of the extrudate.

PREFERRED EMBODIMENT FOR CARRYING OUT THE INVENTION

The present invention is directed toward a flame resistant composition comprising a synergistic mixture of a flame retardant and a compatible additive. The present invention is also directed toward a method for imparting flame resistance to a polymer composition using a synergistic mixture of a flame retardant and a compatible additive.

Preferred flame retardants are NOR substituted hindered amines, which have the formula

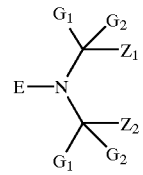

where $G_1$ and $G_2$ are independently alkyl of 1 to 4 carbon atoms or are together pentamethylene, $Z_1$ and $Z_2$ are each methyl or $Z_1$ and $Z_2$ together form a linking moiety which may additionally be substituted by an ester, ether, amide, amino, carboxy or urethane group, and E is $C_1$–$C_{18}$ alkoxy, $C_5$–$C_{12}$ cycloalkoxy, $C_7$–$C_{25}$ aralkoxy, or $C_6$–$C_{12}$ aryloxy. NOR substituted hindered amines are commercially available. For example, the Ciba-Geigy Corporation of Tarrytown, N.Y. markets NOR substituted hindered amines under the tradenames Tinuvin 123 and CGL-116.

A preferred NOR substituted hindered amine is the melt process able amine CGL-116. The major component of this formulation has the formula

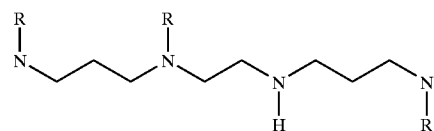

where the R group is

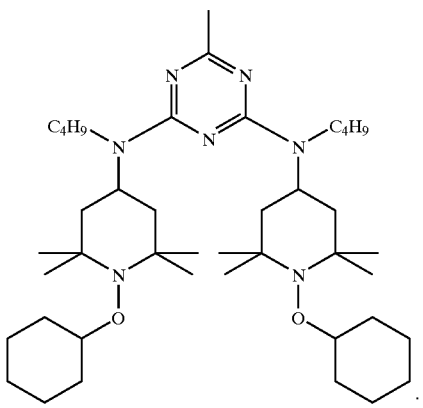

A preferred compatible additive is carbon black. At sufficient concentrations, carbon black also functions as a pigment that does not interfere with the functioning of the flame retardant. Other preferred compatible additives include pigments formed by mixing several basic pigments, e.g., red, yellow, white and the like, with carbon black. These pigment mixtures can function as colorants at sufficient concentrations so long as none of the non-carbon black pigments interfere with the functioning of the flame-retardant. It is also preferred to precompound the flame retardant and the compatible additive prior to compounding these materials with a polymer. This is believed to insure maximum interaction between the compatible additive and the flame retardant prior to compounding with the polymer, thus insuring maximum homogeneous dispersion of the flame retardant through the polymer.

Optionally, supplemental components may also be added to the flame resistant composition. These include conventional additives such as halo-organic or metal-containing flame retardants, antioxidants, UV absorbers and light stabilizers, pigments, metal deactivators, phosphites and phosphonites, peroxide destroying compounds, polyamide stabilizers, basic co-stabilizers, hydroxylamine co-stabilizers, nucleating agents, fillers, reinforcing agents, plasticizers, lubricants, emulsifiers, optical brighteners, insecticides, fungicides, bactericides, antistatic agents, and extrusion aids.

The polymers of the present invention are preferably homopolymers or copolymers of an alpha-olefin. Preferred homopolymers include polyethylene, polypropylene, polybutylene, and mixtures thereof. Preferred copolymers include ethylene/propylene copolymers, polypropylene-butene-1 copolymers, polypropylene/octene-1 copolymers, ethylene/butene-1 copolymers, ethylene/octene-1 copolymers and acrylonitrile/butadiene/styrene (ABS). Polypropylene is an especially preferred polymer.

The composition of the present invention may take any form including that of fibers, yarns, fabrics or textiles, films, sheets, or coatings. Textiles include all types of fabric, including woven, non-woven, knitted, and tufted fabrics. Preferred forms include fibers and fabrics made from the fibers. Non-woven fabrics are especially preferred. It is envisioned that conventional equipment and techniques can be used to prepare the composition of the present invention. It should be understood that the term "fibers" includes cut and uncut fibers and filaments and continuous filaments.

The present invention is also directed toward a flame resistant composition comprising a polymer with improved homogeneous distribution of flame retardant NOR substituted hindered amines throughout the polymer. This improved distribution of the flame retardant is established by the use of a compatible additive in the extrusion of the flame resistant composition. The use of a compatible additive in this manner allows for greater economy in the manufacture of flame resistant polymer compositions due to the decreased amount of flame retardant required and due to a greater ease of manufacture as evidenced by the occurrence of fewer breaks and godet wraps during extrusion. The use of a compatible additive also provides for a higher uniformity and therefore, higher quality, of the final product.

The present invention is also directed toward a method for rendering a polymer flame resistant. This method comprises mixing a polymer with the synergistic mixture of the present invention. A preferred method of mixing the polymer and the mixture is by extrusion. It is also preferred that the flame retardant and the compatible additive be premixed together prior to mixing these materials with a polymer.

The following examples are provided to demonstrate practice of the invention but should not be viewed as limiting the scope of the invention. The claims will serve to define the inventions.

EXAMPLE 1

Polypropylene was compounded with varying amounts of the NOR substituted hindered amine CGL-116 and compared to polypropylene samples without CGL-116. The propensity of the fabrics to burn was measured using a Limiting Oxygen Index (LOI) test as described in ASTM D 2863-95. Briefly, the test involves forming the polymer sample to be tested into a specific shape which is similar to a popsicle stick. This is done by placing the solid material into a form and melting with a hot plate. The cooled shape is then placed into a bell jar containing a known composition of nitrogen and oxygen. The gas composition can be varied and a set flow rate is maintained during the test. The top of the bell jar is open to allow the flow outward and to allow a butane lighter access to the shaped polymer. The flame is held against the end of the "popsicle stick" for a predetermined time, then burn time is measured with a stopwatch.

The LOI is defined as the oxygen concentration, expressed as percent, at which the sample self-extinguishes in under 3 minutes, or takes longer than 3 minutes to burn to 50 mm. Samples which burn to 50 mm more quickly at some percentage of oxygen can be assumed to be not quite as good as one that burns to 50 mm slower or goes out during the test. Generally, samples that exhibit burn times of longer than 2 minutes at a given oxygen concentration are considered to have a desirable level of flame resistance while samples with burn times of less than one minute were considered undesirable. Samples that self-extinguished were considered most desirable.

Samples containing 0 percent or 1 percent CGL-116 were fiber samples that were melted into the required shape using a standard mold/form. All other samples in this example were produced by mixing concentrated CGL-116 and polypropylene pellets in a heated Banbury-type laboratory mixer and were molded into the required form without being extruded into fibers as an intermediate step. The results of this test are summarized in Table 1.

TABLE 1

Polypropylene with 0–3% CGL-116

| Sample No. | % CGL-116 | % Oxygen | Description of burn |
|---|---|---|---|
| 1 | 0 | 18.0 | Burns to 50 mm in 3 minutes |
| 2 | 0.6 | 19.5 | Burns to 50 mm in 2.5 minutes (less drips) |

TABLE 1-continued

Polypropylene with 0–3% CGL-116

| Sample No. | % CGL-116 | % Oxygen | Description of burn |
|---|---|---|---|
| 3 | 1 | 19.5 | Burns to 50 mm in 2.5 minutes (more drips) |
| 4 | 1.2 | 19.5 | Did not burn |
| 5 | 0.6 | 20.0 | Burns to 50 mm in 2 minutes |
| 6 | 1 | 20.0 | Burns to 50 mm in 1.5 minutes |
| 7 | 1.2 | 20.0 | Burns to 50 mm over 3 minutes |
| 8 | 0.6 | 21.0 | Burns to 50 mm in 1 minute |
| 9 | 1 | 21.0 | Burns to 50 mm in 1 minute |
| 10 | 1.2 | 21.0 | Burns to 50 mm in 1 minute |
| 11 | 1.8 | 21.0 | Burns to 50 mm in 3 minutes |
| 12 | 2.4 | 21.0 | Burns to 50 mm in 4 minutes |
| 13 | 3 | 21.0 | No flame; self extinguishing |
| 14 | 0 | 19.2 | Burns to 50 mm |
| 15 | 0.6 | 22.2 | Burns to 50 mm |
| 16 | 1 | 22.2 | Burns to 50 mm |
| 17 | 1.2 | 22.2 | Burns to 50 mm |
| 18 | 1.8 | 22.2 | Burns to 50 mm |
| 19 | 2.4 | 22.2 | Burns to 50 mm |
| 20 | 3 | 22.2 | Burns to 50 mm |

Table 1 indicates that non-flame resistant polypropylene has an LOI of approximately 18, while polypropylene with 0.6 percent to 1.2 percent CGL-116 has an LOI of approximately 19–20. These results also indicate that better flame resistance is achieved in samples subjected to more vigorous mixing. Samples containing 0.6 percent CGL-116 that were mixed in the Banbury-type mixer demonstrated equal or superior fire resistance to those samples containing 1 percent CGL-116 which were formed from extruded fibers which were subsequently molded into the required form. Compare, for example, sample 2 to sample 3, and sample 5 to sample 6.

EXAMPLE 2

Polypropylene was compounded with varying amounts of the NOR substituted hindered amine CGL-116 and 0.49 percent of carbon black. The concentrations of CGL-116 varied from 1.2 percent to 3 percent. These samples were produced in a laboratory mixer and directly molded into the required form as in Example 1. The propensity of the samples to burn was measured using the LOI test procedure as described in Example 1. The results of this test are summarized in Table 2.

TABLE 2

1.2%–3% CGL-116 with 0.49% Carbon Black

| Sample No. | % CGL-116 | % Oxygen | Description of burn |
|---|---|---|---|
| 1 | 1.2 | 19.3 | Did not burn |
| 2 | 1.2 | 21.0 | Burned to 50 mm in 1 minute 12 seconds |
| 3 | 1.2 | 23.0 | Burned to 50 mm in 46 seconds |
| 4 | 1.6 | 19.3 | Burned out after flame removed |
| 5 | 1.6 | 19.3 | Burned out after flame removed |
| 6 | 1.6 | 19.3 | Burned out after flame removed |
| 7 | 2 | 19.3 | Burned out after flame removed |
| 8 | 2 | 19.3 | Burned out after flame removed |
| 9 | 2 | 19.3 | Burned out after flame removed |
| 10 | 3 | 19.3 | Burned out after flame removed |
| 11 | 3 | 19.3 | Burned out after flame removed |
| 12 | 3 | 19.3 | Burned out after flame removed |

No formulation tested showed a propensity to burn. Furthermore, samples containing 0.49 percent carbon black demonstrated equal or greater flame resistance than similar samples not containing carbon black which were tested in example 1.

EXAMPLE 3

Polypropylene was again compounded with varying amounts of the NOR substituted hindered amine CGL-116 and 0.49 percent of carbon black. The concentrations of CGL-116 varied from 0.4 percent to 1 percent. These samples were produced in a laboratory mixer and directly molded into the required form as in Example 3. The propensity of the samples to burn was measured using the LOI test procedure as described above. The results of this test are summarized in Table 3.

TABLE 3

0.4%–1% CGL-116 with 0.49% Carbon Black

| Sample No. | % CGL-116 | % Oxygen | Description of burn |
|---|---|---|---|
| 1 | 0.4 | 19.3 | Self extinguishing |
| 2 | 0.4 | 19.3 | Burned to 50 mm in 2 minutes, 35 seconds |
| 3 | 0.4 | 19.3 | Burned to 50 mm in 2 minutes, 45 seconds |
| 4 | 0.6 | 19.3 | Self extinguishing |
| 5 | 0.6 | 19.3 | Self extinguishing after 5 seconds |
| 6 | 0.6 | 19.3 | Self extinguishing after 7 seconds |
| 7 | 0.8 | 19.3 | Self extinguishing |
| 8 | 0.8 | 19.3 | Self extinguishing after 5 seconds |
| 9 | 0.8 | 19.3 | Self extinguishing after 7 seconds |
| 10 | 1 | 19.3 | Self extinguishing |
| 11 | 1 | 19.3 | Self extinguishing after 7 seconds |
| 12 | 1 | 19.3 | Self extinguishing |

Samples containing 0.49 percent carbon black demonstrated flame resistance at CGL-116 levels of 0.4–0.6 percent.

EXAMPLE 4

Polypropylene was compounded with varying amounts of the NOR substituted hindered amine CGL-116 and 0.10 percent of carbon black. The concentrations of CGL-116 varied from 0.3 percent to 0.7 percent. Samples were produced as in Example 2 and the propensity of the samples to burn was tested using the LOI test procedure described above with an oxygen concentration of 19.3 percent. These samples also displayed resistance to burning. The results of this test are summarized in Table 4.

TABLE 4

0.3%–0.7% CGL-116 with 0.10% Carbon Black

| Sample No. | % CGL-116 | % Oxygen | Description of burn |
|---|---|---|---|
| 1 | 0.3 | 19.3 | Burned past 50 mm in 1 minute 27 seconds |
| 2 | 0.3 | 19.3 | Burned past 50 mm in 1 minute 40 seconds |
| 3 | 0.3 | 19.3 | Burned past 50 mm in 1 minute 5 seconds |
| 4 | 0.3 | 19.3 | Burned past 50 mm in 45 seconds |
| 5 | 0.3 | 19.3 | Burned past 50 mm in 1 minute 15 seconds |
| 6 | 0.5 | 19.3 | Burned past 50 mm in 1 minute 10 seconds |

TABLE 4-continued 0.3%–0.7% CGL-116 with 0.10% Carbon Black

| Sample No. | % CGL-116 | % Oxygen | Description of burn |
|---|---|---|---|
| 7 | 0.5 | 19.3 | Burned past 50 mm in 55 seconds |
| 8 | 0.5 | 19.3 | Burned past 50 mm in 1 minute 5 seconds |
| 9 | 0.5 | 19.3 | Burned past 50 mm in 1 minute 20 seconds |
| 10 | 0.5 | 19.3 | Burned past 50 mm in 1 minute 15 seconds |
| 11 | 0.7 | 19.3 | Burned out after flame removed |
| 12 | 0.7 | 19.3 | Burned out after 55 seconds, only burned to 5 mm |
| 13 | 0.7 | 19.3 | Burned out at 2 minutes 10 seconds, only burned to 40 mm |
| 14 | 0.7 | 19.3 | Burned out at 1 minute 40 seconds, only burned to 55 mm |
| 15 | 0.7 | 19.3 | Burned out at 3 seconds, only burned to 6 mm |

EXAMPLE 5

Polypropylene was compounded with varying amounts of the NOR substituted hindered amine CGL-116 and 0.5 percent carbon black to produce black fibers. Samples in this example were produced by mixing concentrated CGL-116 and polypropylene pellets in a heated Banbury-type laboratory mixer and were molded into the required form without being extruded into fibers as an intermediate step. The propensity of the samples to burn was tested using the LOI test procedure described above with an oxygen concentration of 19.3 percent. All of these samples displayed resistance to burning. The results of this test are summarized in Table 5.

TABLE 5

0.4%–3% CGL-116 with 0.5% Carbon Black

| Sample No. | % CGL-116 | % Oxygen | Description of burn |
|---|---|---|---|
| 1 | 0.4 | 19.3 | Burned to 50 mm in 2 minutes, 40 seconds |
| 2 | 0.4 | 19.3 | Burned to 50 mm in 2 minutes, 55 seconds |
| 3 | 0.4 | 19.3 | Burned to 50 mm in 3 minutes |
| 4 | 0.8 | 19.3 | Flame went out after 3 seconds |
| 5 | 0.8 | 19.3 | Flame went out after 2 seconds |
| 6 | 0.8 | 19.3 | Flame went out immediately |
| 7 | 1.2 | 19.3 | Flame went out after 2 seconds |
| 8 | 1.2 | 19.3 | Flame went out after 3 seconds |
| 9 | 1.2 | 19.3 | Flame went out after 1 second |
| 10 | 1.6 | 19.3 | Flame went out after 4 seconds |
| 11 | 1.6 | 19.3 | Flame went out immediately |
| 12 | 1.6 | 19.3 | Flame went out after 2 seconds |
| 13 | 2 | 19.3 | Flame went out after 5 seconds |
| 14 | 2 | 19.3 | Flame went out after 5 seconds |
| 15 | 2 | 19.3 | Flame went out after 4 seconds |
| 16 | 2.4 | 19.3 | Flame went out after 3 seconds |
| 17 | 2.4 | 19.3 | Flame went out immediately |
| 18 | 2.4 | 19.3 | Flame went out after 3 seconds |
| 19 | 3 | 19.3 | Flame went out after 2 seconds |
| 20 | 3 | 19.3 | Flame went out after 3 seconds |
| 21 | 3 | 19.3 | Flame went out immediately |

EXAMPLE 6

Several different bales of polypropylene fibers were tested in triplicate for flame resistance using the LOI test method as described hereinabove. Polypropylene was compounded with the NOR substituted hindered amine CGL-116 and varying amounts of carbon black. In one set of extrusions, 0.60 percent CGL-116 and 0.49 percent carbon black were present, producing black fibers. In another set of extrusions, 0.70 percent CGL-116 and 0.06 percent carbon black were present, producing gray fibers. The propensity of the samples to burn was measured. Results of these tests are summarized in Table 6 and Table 6A. Both of these types of fibers displayed equivalent or greater flame resistance than non-pigmented fire resistant fibers containing 1.1 percent CGL-116. This represents a 40 percent reduction of CGL-116 levels for black fibers and a 30 percent reduction for gray fibers.

TABLE 6

0.6% CGL-116 with 0.49% Carbon Black

| Sample No. | % Oxygen | Description of burn |
|---|---|---|
| 1A | 19.0 | Flame burned for 3 minutes but did not reach 50 mm |
| 1B | 19.0 | Flame burned for 3 minutes but did not reach 50 mm |
| 1C | 19.0 | Burned to 50 mm in 2 minutes, 55 seconds |
| 2A | 19.0 | Flame burned for 3 minutes but did not reach 50 mm |
| 2B | 19.0 | Flame burned for 2 minutes, 15 seconds but did not reach 50 mm |
| 2C | 19.0 | Flame burned for 3 minutes but did not reach 50 mm |
| 3A | 19.0 | Flame burned for 2 minutes, 50 seconds but did not reach 50 mm |
| 3B | 19.0 | Burned to 50 mm in 3 minutes |
| 3C | 19.0 | Burned to 50 mm in 3 minutes |
| 4A | 19.0 | Self extinguished after 9 seconds |
| 4B | 19.0 | Flame burned for 3 minutes but did not reach 50 mm |
| 4C | 19.0 | Flame burned for 3 minutes but did not reach 50 mm |
| 5A | 19.0 | Burned to 50 mm in 3 minutes |
| 5B | 19.0 | Flame burned for 3 minutes but did not reach 50 mm |
| 5C | 19.0 | Flame burned for 3 minutes but did not reach 50 mm |

TABLE 6A 0.7% CGL-116 with 0.06% Carbon Black

| Sample No. | % Oxygen | Description of burn |
|---|---|---|
| 1A | 19.3 | Burned to 50 mm in 2 minutes, 33 seconds |
| 1B | 19.3 | Burned to 50 mm in 2 minutes, 10 seconds |
| 1C | 19.3 | Burned to 50 mm in 2 minutes, 55 seconds |
| 2A | 19.3 | Burned to 50 mm in 1 minute, 15 seconds |
| 2B | 19.3 | Burned to 50 mm in 2 minutes, 5 seconds |
| 2C | 19.3 | Burned to 50 mm in 2 minutes |
| 3A | 19.3 | Burned to 50 mm in 1 minute, 36 seconds |
| 3B | 19.3 | Burned to 50 mm in 1 minute, 10 seconds |
| 3C | 19.3 | Burned to 50 mm in 1 minute, 5 seconds |
| 4A | 19.3 | Burned to 50 mm in 1 minute, 15 seconds |
| 4B | 19.3 | Burned to 50 mm in 2 minutes, 13 seconds |
| 4C | 19.3 | Burned to 50 mm in 1 minute |

EXAMPLE 7

(Control)

Polypropylene fibers supplemented with the additive $TiO_2$ were tested in triplicate for flame resistance using the LOI test method as described above. Polypropylene was compounded with CGL-116 and either 0.5 percent $TiO_2$ or 1 percent $TiO_2$. Samples were produced as in Example 5 hereinabove. The propensity of the samples to burn was measured by the LOI test as mentioned above. Results of these tests are summarized in Table 7. $TiO_2$ supplemented samples showed little flame resistance.

TABLE 7

0.6% CGL-116 with 0.5% or 1% $TiO_2$

| Sample No. | % $TiO_2$ | % Oxygen | Description of burn |
|---|---|---|---|
| 1 | 0.5 | 19.3 | Burned to 55 mm in 62 seconds |
| 2 | 0.5 | 19.3 | Burned to 55 mm in 55 seconds |
| 3 | 0.5 | 19.3 | Burned to 55 mm in 75 seconds |
| 4 | 1 | 19.3 | Burned to 55 mm in 55 seconds |
| 5 | 1 | 19.3 | Burned to 55 mm in 45 seconds |
| 6 | 1 | 19.3 | Burned to 55 mm in 50 seconds |

EXAMPLE 8

Polypropylene was compounded with 0.7 percent CGL-116 and a mixture of pigments to produce a pigmented composition.

These pigments and comparable, suitable variations can be reproduced by mixing four pigments, red, yellow, black and white, within the following ranges. Each of the pigments is identified by its Color Index (CI) number and is followed by an amount, in percent by weight.

MEDIUM DARK NEUTRAL

| PIGMENT | AMOUNT % |
|---|---|
| Red CI 101 | 0.16 to 0.25 |
| Yellow CI 119 | 0.33 to 0.50 |
| Black CI 7 | 0.09 to 0.14 |
| White CI 6 | 0.33 to 0.50 |
| Total | 0.91 to 1.39 |

In the foregoing formula the black pigment is carbon black. The remaining contents of the formula included 0.7 percent of the flame retardant (CGL-116), and the balance polypropylene resin to total 100 percent by weight. Accordingly, the lowest amount of carbon black evaluated in this Example was about 0.09 percent by weight and as the test results reveal, this was an effective amount of compatible additive to allow usage of 0.7 percent of CGL-116.

Samples were produced by the same method as in Example 7 above and the propensity of the samples to burn was tested using the LOI test procedure described above with an oxygen concentration of 19.3 percent. These samples displayed resistance to burning. The results of this test are summarized in Table 8.

Of course, it is to be appreciated that the pigment selected was chosen to provide a conventional color for polypropylene fibers (medium dark neutral) and thus, practice of the present invention is not limited by the resultant color of the fiber. Instead, as Example 8 establishes, other pigments can be combined with carbon black and added to compositions containing a flame retardant as disclosed herein, to produce the results of the present invention so long as these pigments would not increase the flammability of the polypropylene fiber products.

TABLE 8

0.7% CGL-116 with Carbon Black Containing Pigments

| Sample No. | Pigment | % Oxygen | Description of burn |
|---|---|---|---|
| 1 | Neutral | 19.3 | Low flame did not reach 50 mm in 3 minutes |
| 2 | Neutral | 19.3 | Low flame did not reach 50 mm in 3 minutes |
| 3 | Neutral | 19.3 | Low flame did not reach 50 mm in 3 minutes |
| 4 | Neutral | 19.3 | Low flame did not reach 50 mm in 3 minutes |
| 5 | Neutral | 19.3 | Low flame did not reach 50 mm in 3 minutes |
| 6 | Neutral | 19.3 | Low flame did not reach 50 mm in 3 minutes |
| 7 | Neutral | 19.3 | Low flame did not reach 50 mm in 3 minutes |
| 8 | Neutral | 19.3 | Low flame did not reach 50 mm in 3 minutes |
| 9 | Neutral | 19.3 | Low flame did not reach 50 mm in 3 minutes |

Based upon the foregoing data, it should be evident that the present invention is highly effective in providing a flame resistant composition comprising a polymer and a synergistic mixture comprising a non-halogenasted flame retardant compound and a compatible additive. It should also be evident that the present invention provides a method for imparting flame resistance to a polymer. Finally, it should be evident that the present invention provides a pigmented flame resistant composition.

Based further upon the foregoing disclosure, it should now be apparent that the present invention will carry out the objects set forth hereinabove. It is, therefore, to be understood that any variations evident fall within the scope of the claimed invention and thus, the selection of specific component elements can be determined without departing from the spirit of the invention herein disclosed and described.

We claim:

1. A method of rendering a polymer flame resistant comprising compounding said polymer with a synergistic mixture comprising:

(i) from about 0.6 to about 3 percent of a non-halogenated N-alkoxy hindered amine flame retardant compound; and (ii) at least about 0.06 percent of carbon black; wherein said percentages are based on weight percent of polymer plus said synergistic mixture, and wherein polymer plus synergistic mixture equals 100 percent, and wherein the polymer plus synergistic mixture displays a greater flame resistance than a composition consisting of an identical polymer and an identical percentage amount of an identical non-halogenated N-alkoxy hindered amine and further wherein said polymer is a polyolefin polymerized from at least one olefin having between 2 and 12 carbon atoms.

2. The method of claim 1, wherein said polyolefin is polypropylene or polyethylene.

3. The method of claim 1, wherein said non-halogenated N-alkoxy hindered amine is the amine having the formula

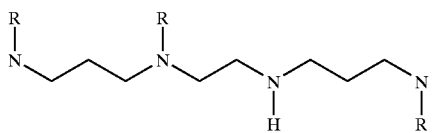

where the R group is

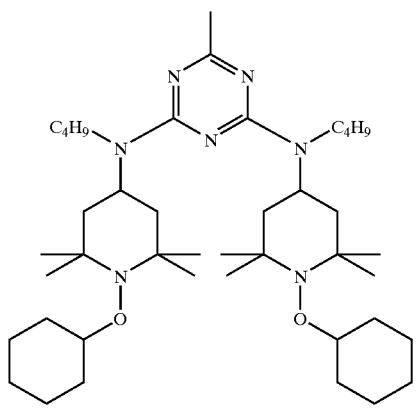

4. A flame resistant fiber made according to the method of claim 1.

5. A flame resistant yarn comprising the fiber of claim 4.

6. A flame resistant fabric comprising the fiber of claim 4.

7. The fabric of claim 6, wherein the fabric is an automotive fabric.

8. The method of claim 3, wherein said polymer is selected from the group consisting of polypropylene and polyethylene.

9. A method for improving the flame resistance of a polymer composition, the polymer composition comprising a polymer and a non-halogenated N-alkoxy hindered amine flame retardant compound, the method comprising:

mixing at least about 0.06 weight percent of carbon black to between about 0.6 and about 3 percent of the non-halogenated N-alkoxy hindered amine flame retardant compound to provide a synergistic mixture; and adding said synergistic mixture to a polymer by compounding to provide an improved flame resistant polymer composition, wherein said improved flame resistant polymer composition displays a greater flame resistance than a composition consisting of an identical polymer and an identical weight percentage amount of an identical non-halogenasted N-alkoxy hindered amine, and wherein said weight percentages are percentages of the improved flame resistant polymer composition and further wherein said polyner is a polyolefin polymerized from at least one olefin having between 2 and 12 carbon atoms.

10. The method of claim 9, wherein said polyolefin is polypropylene or polyethylene.

11. The method of claim 9, wherein said non-halogenated N-alkoxy hindered amine is the amine having the formula

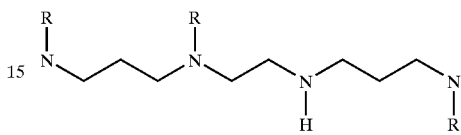

where the R group is

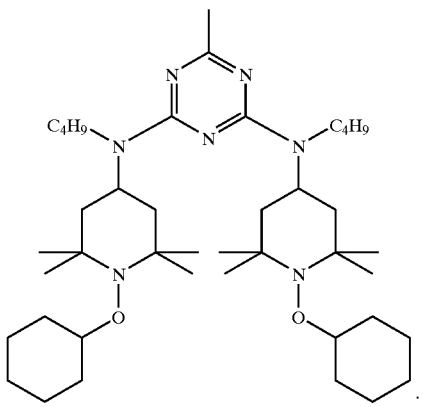

12. The method of claim 9, wherein said improved flame resistant polymer composition is additionally formed into a fiber.

13. The method of claim 12, wherein said fiber is further processed to form a component of a yarn.

14. The method of claim 12, wherein said fiber is further processed to form a component of a fabric.

15. The method of claim 14, wherein said fabric is an automotive fabric.

* * * * *